Feb. 12, 1946. W. W. HECKETHORN 2,394,769
AUTOMATIC DRILL PRESS FEEDER
Filed Aug. 2, 1943 2 Sheets-Sheet 1
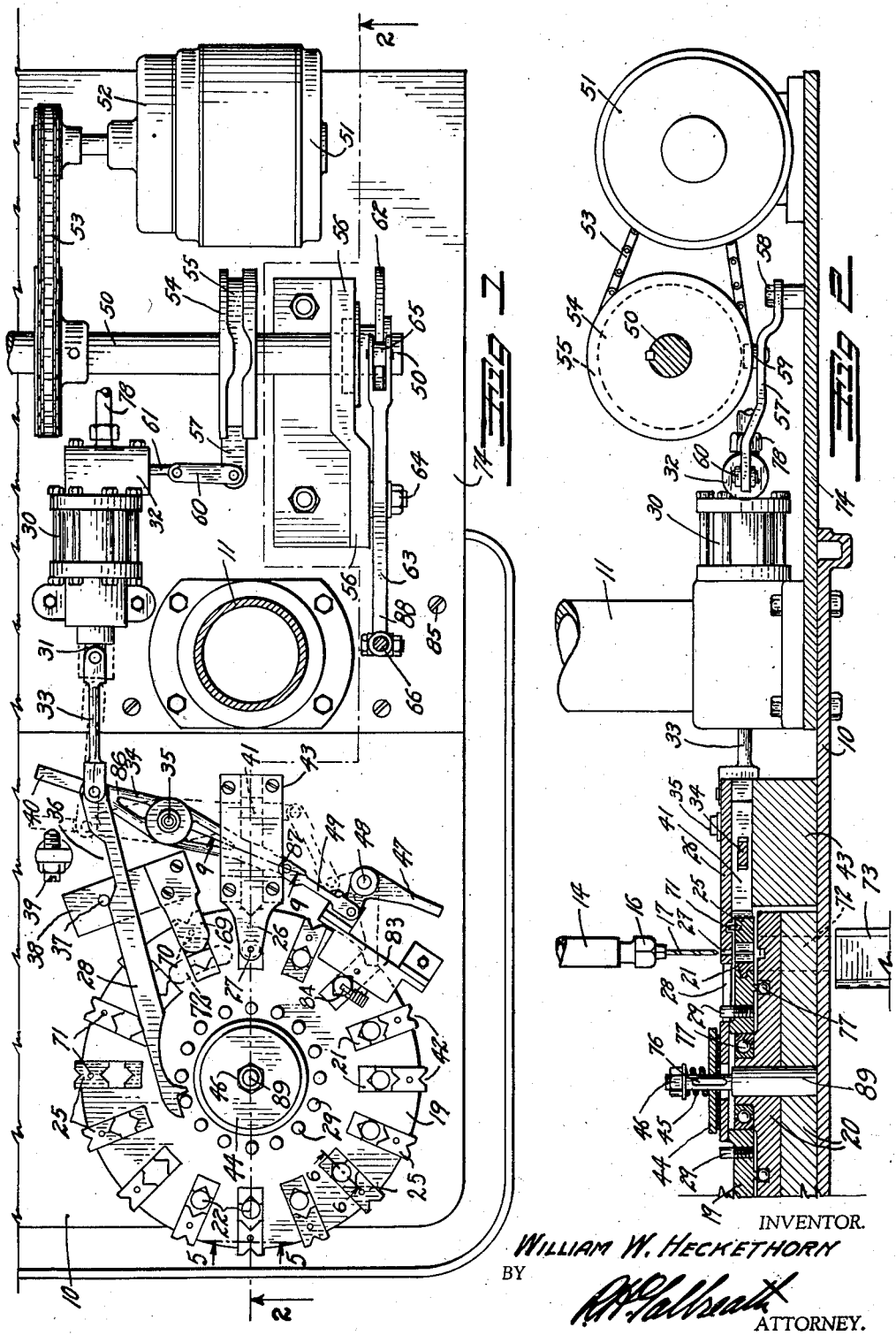
INVENTOR.
WILLIAM W. HECKETHORN
BY
ATTORNEY.

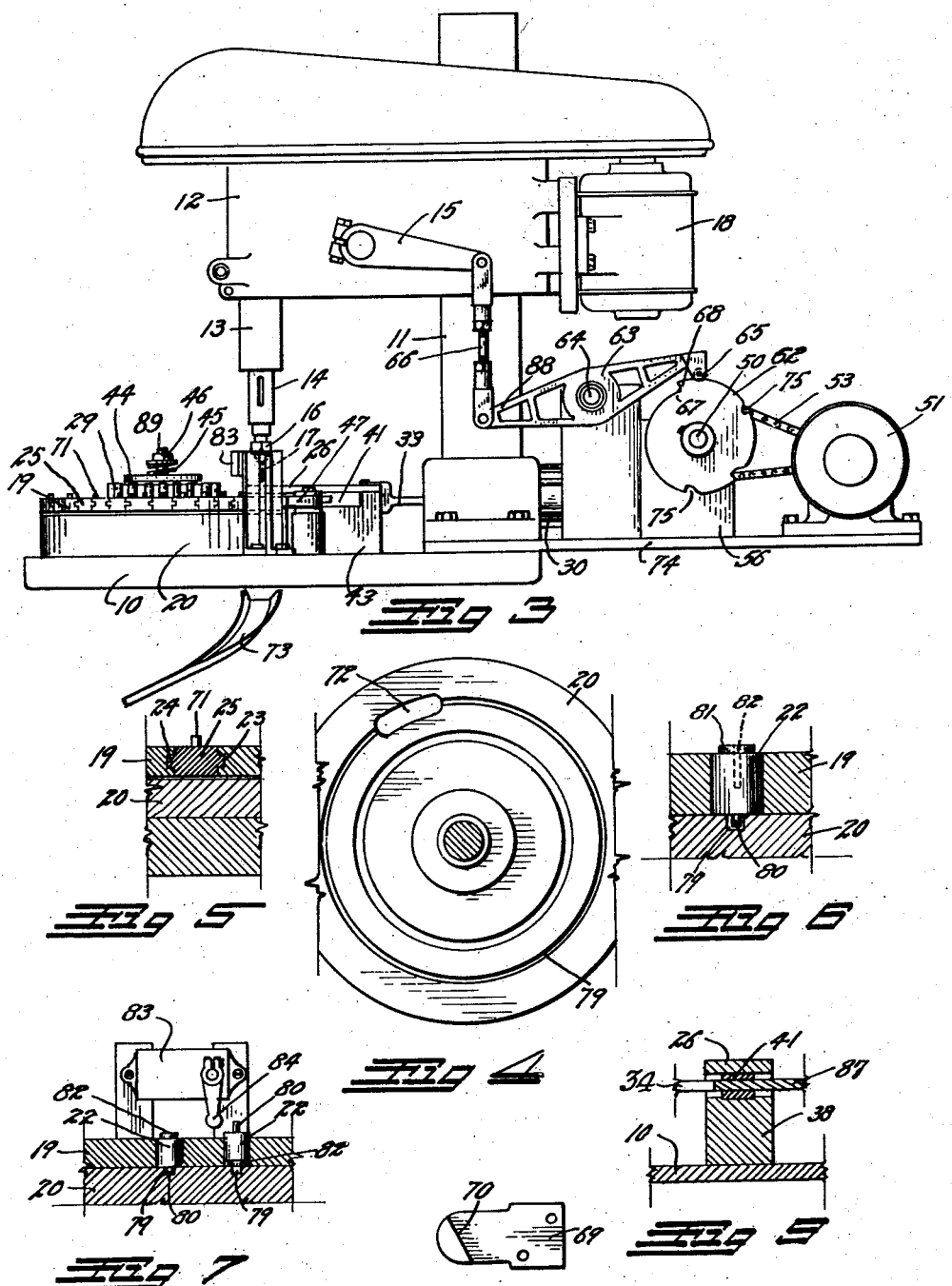

Patented Feb. 12, 1946

2,394,769

UNITED STATES PATENT OFFICE 2,394,769

AUTOMATIC DRILL PRESS FEEDER

William W. Heckethorn, Littleton, Colo., assignor to Heckethorn Manufacturing & Supply Co., Littleton, Colo., a corporation of Colorado Application August 2, 1943, Serial No. 497,114

9 Claims. (Cl. 77—64)

This invention relates to a device for feeding a drill press and has for its principal object the provision of a simple and highly efficient device which will continuously feed the work to the drill, accurately align it therewith and firmly hold the work during the drilling operation.

Other objects of the invention are to provide automatic means for feeding the drill to the work in such a manner as to obtain the most rapid and efficient drilling possible and to prolong the life of the drill; and to perform all of the above operations in the shortest possible time so as to obtain maximum capacity from the drill press.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a plan view of the improved drill press feeding mechanism applied to a typical drill press;

Fig. 2 is a longitudinal section through the feeding mechanism, taken on the line 2—2, Fig. 1;

Fig. 3 is a smaller scale side view of the invention applied to a typical drill;

Fig. 4 is a fragmentary plan view of the work block employed below the feed disc of the invention.

Fig. 5 is an enlarged detail section through one of the gripping jaws employed in the feed wheel of the device, taken on the line 5—5, Fig. 1;

Fig. 6 is a still further enlarged detail section taken on the line 6—6, Fig. 1, illustrating a type of work piece upon which the invention may be used;

Fig. 7 illustrates the application of a safety stop to the device;

Fig. 8 is a detail bottom view of the vise opening arm of the device; and

Fig. 9 is a vertical detail section through the feed wheel aligning mechanism, taken on the line 9—9, Fig. 1.

Parts of a typical drill press are designated in the drawings by numeral as follows: table 10, drill post 11, head 12, drill sleeve 13, drill spindle 14, drill feeding lever 15, chuck 16, drill 17, and drive motor 18. The work piece upon which the drilling is to be done is indicated at 22. The invention is designed to accurately place and hold the work piece 22 below the drill 17 and then properly operate the drill press lever 15 to drill the required hole for the required depth in the work. The above is accomplished by rotatably mounting a horizontal feed wheel 19 upon a suitable supporting block 20, secured to the table 10. The periphery of the disc is radially slotted at equi-spaced points. A fixed vise jaw 21 is mounted in the end of each slot toward the axis of the wheel. The vise jaws 21 each contain a V-shaped notch for receiving the cylindrical side of the work piece 22. The sides of each slot are channeled as indicated at 23, Fig. 5, and the vise jaws are formed with suitable ribs 24 which enter these channels to retain the jaws in place in the slots. The work piece 22 is held in place by means of a sliding clamping jaw 25 also provided with suitable guide tongues which engage in the channels 23. The work piece 22 rests on the top of the block 20.

The wheel 19 is so positioned that at one point of its revolution, the work pieces will be brought directly below the axis of the drill 17. At this point, a fixture plate 26 is provided. The fixture plate 26 contains a guide hole 27 through which the drill passes, and by which it is held in the desired position. The wheel 19 is successively rotated to bring each work piece accurately below the hole 27 by means of a reciprocating pusher arm 28, the extremity of which is notched to successively engage the successive pins of a series of gauge pins 29. The gauge pins 29 project upwardly from the disc 19, there being one pin for each of the peripheral slots. The pusher arm 28 may be reciprocated after each drilling operation by means of any desired mechanism.

As illustrated, the reciprocation of the pusher arm is accomplished through the medium of a compressed air cylinder 29. The air cylinder is of any standard design containing a suitable piston, from which a piston rod 31 projects, and having a suitable internal spring (not shown) for retracting the piston rod. The flow of air to the piston from a pressure pipe 78 is controlled by means of a suitable standard slide valve designated in its entirety by the numeral 32. The piston rod 31 is connected through the medium of a connecting rod 33 with one extremity 86 of a double swinging lever 34. The pusher arm 28 is also connected to the extremity 86 of the lever 34. The lever 34 is rotatably mounted intermediate its extremities upon a suitable pivot pin 35. It will be noted that one side of the pusher arm 28 is notched as shown at 36, and that this notch coacts with a pin 37 on a supporting slide block 38.

The action of the pusher arm is as follows: When air is admitted to the cylinder 30 through the medium of the slide valve 32, it acts through the piston rod 31 and connecting rod 33 to push the extremity of the swinging lever 34 forwardly to the broken line position of Fig. 1. This causes the hooked extremity of the pusher arm 38 to push against one of the gauge pins 29 to rotate the wheel 19 one vise space. The slide valve 32 now operates to discharge the air from the cylinder to allow the piston rod 31 to move rearwardly. The rearward movement of the rod 31 causes the pusher arm 28 to move backwardly, with the pin 37 riding in the notch 36. When the pin reaches the extremity of this notch, as shown in Fig. 1, it will act against the pusher arm to force it into contact with the next successive gauge pin 29. The amount of forward movement of the pusher arm can be accurately regulated by means of a stop screw 39 positioned in the path of an extended extremity 40 on the swinging arm 34.

While the operation of the pusher arm is fairly accurate, it may not be sufficiently accurate to properly align the work piece with the drill hole 27. The final accurate placement is accomplished by means of a wedge-shaped aligning bar 41, the pointed extremity of which is forced into engagement with an aligning notch 42 cut in the outer end of each of the movable vise jaws 25. This is accomplished by extending an arm 87 of the swinging lever 34 through a guide block 43 and through the aligning bar 41 which is slidably mounted therein. The guide block is accurately positioned and acts not only as a guide for the aligning bar 41, but also to support the drill fixture plate 26. Therefore each time the swinging lever 34 returns to its rearward or retracted position, its extremity will force the aligning bar 41 forwardly into the notch 42 of the aligned vise jaw to accurately position this jaw below the drill and to firmly grip the work between the two jaws 21 and 25.

It has also been found that for positive accurate operation some means are necessary to stop the rotation of the disc 19 so that it will not carry beyond the aligning bar 41. This is partially accomplished by means of a friction brake disc 44 which is constantly held against the wheel 19 by means of a suitable compression spring 45, the compression in which is regulated by means of a nut 46. The brake disc is splined or keyed to the axial shaft 89 in a suitable key-way 76 so that it can not rotate thereon. A final positive stop is provided by means of a stop lever 47 which is mounted on the table 10 upon a suitable pivot pin 48. This lever has a bell-crank shape and one arm thereof is connected by means of a short connecting rod 49 with the extremity of the swinging lever 34. Each time the lever 34 is pushed forwardly to rotate the wheel 19, the stop lever 47 is also swung forwardly until it engages in the aligning notch 42 of one of the vise jaws 25 to stop the rotation of the disc 19 at the termination of its interval of movement. The stop lever 47 then moves away to allow the aligning block 41 to accurately position the wheel 19.

The various steps in the operation of the machine are initiated from a control shaft 50 which is rotated by an operating motor 51 through the medium of a suitable speed reducer 52 and any suitable power transmission such as a chain drive 53.

The control shaft 50 is mounted in a bearing plate 56 and carries a cylindrical cam 54 having a cam track 55 in its periphery. A hinged cam lever 57 is positioned below the cam 54 and pivoted at one of its extremities on a suitable pivot post 58. A cam follower roller 59 on the lever 57 rides in the cam track 55. The free extremity of the lever 57 is connected by means of a suitable link 60 to a valve rod 61 operating the slide valve 32. The cam track 65 is so contoured that once during each revolution it will actuate the slide valve 32 to operate the feed wheel rotating mechanism.

The control shaft 50 also acts to press the drill 17 downwardly into the work piece. This is accomplished through the medium of an edge cam 62 mounted on the shaft 50. A rocker arm 63 is mounted on a suitable hinge stud 64 on the bearing plate 56. The rocker arm carries a cam follower roller 65 which rides on the cam 62. The other extremity of the rocker arm, indicated at 88, is connected by means of an adjustable connecting rod 66 with the drill feeding lever 15 of the drill press.

It is desired to call attention to the contour of the cam 62. The contour starts a low point 67 and thence spirals outwardly to a high point 68. The angle of the outward spiral corresponds to maximum feed capacity of the particular drill being used. A plurality of chip breaking notches 75 are formed in the spiral edge of the cam. The cam 62 is so placed on the shaft 50 that when the work has been properly centered under the drill, the follower roll 65 will start to travel up the spiral edge of the cam forcing the drill downwardly into the work piece. After the drill has drilled a predetermined distance, the roller 65 will drop into the first notch 75, quickly lifting the drill from the drill hole to break the drill chip. It then will continue along the spiral to the next notch 75 where a similar operation will be performed, and until the high point 68 is reached. It will then drop to the low point 67 to completely withdraw the drill to allow operation of the wheel rotating mechanism.

A vise opening bracket 69 is mounted on the block 38 so as to extend over the path of the movable jaws 25. The bracket 69 carries a beveled, downwardly projecting boss 70 on its lower face. The beveled side of this boss is positioned in the path of a series of opening pins 71, there being one of these pins in each of the movable jaws 25. As soon as the drilling operation has been completed on a piece of work, its vise will move beneath the vise opening bracket 79 where the inclined boss 70 will contact the pin 71 therein so as to withdraw the movable jaw allowing the work piece 22 to drop through a receiving opening 72 formed through the supporting block 20 and through the bed 10 to a suitable receiving chute 73.

The device is attached to the standard table of a drill press and the operating mechanism is supported from the table upon a shelf plate 74 which is secured to the drill press in any desired manner such as by means of cap screws 85 tapped into the drill press table.

The size and shape of the vise jaws depends upon the size and shape of the particular work piece being operated upon. As illustrated, the device is set up to drill an axial hole 82 in a cylindrical work piece 22. The latter has a flat button 81 projecting from the drilled extremity and a short axial stem 80 projecting from the other extremity.

An annular groove 79 is formed in the upper face of the base block 20 immediately below the work pieces to accommodate the passage of the stem 80, as shown in Figs. 4 and 6. It will be noted that if the operator should accidentally place a work piece between the jaws in an inverted position, as indicated by the right hand piece of Fig. 7, the piece will project above the remaining correctly inserted work pieces. Advantage is taken of this fact to provide an automatic stop in such emergencies.

The automatic stop comprises a standard tilt switch 83 as shown in Fig. 7. The switch 83 is supported above the path of the work pieces on the table in the position shown in broken line in Fig. 1. The arm of the switch, shown at 84, depends over the work pieces so that whenever an inverted work piece passes, it will, due to its extra heighth strike the arm 84 and tilt the switch to close an electrical circuit to any suitable feed stopping device such as a solenoid valve on the pressure line 78. The drill continues to reciprocate in the drilled hole of the last finished piece until the inverted piece has been correctly placed.

The control shaft 50 may extend along a row of drill presses controlling all of them in their proper sequence. A single operator can feed the work pieces between the vise jaws of a plurality of feeders since the remainder of the drilling operation is handled automatically by the improved feeding device.

It is preferred to mount the rotating feed wheel or table on both radial and axial thrust bearing balls 77 to facilitate its movement, avoid wear and preserve its accuracy.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A drill press feeding device comprising: a horizontal rotary table having a plurality of equally spaced vise slots in its periphery, said table being positioned to successively bring said slots below the drill of said press; a fixed vise jaw in the axial extremity of each slot; a movable vise jaw in the peripherial extremity of each slot having a notch in its outer end; means for successively rotating said table one slot space; and wedge means engageable in the notch of the movable jaw to clamp the work and accurately place it below the drill in advance of each drilling operation.

2. A drill press feeding device comprising: a horizontal rotary table having a plurality of equally spaced vise slots in its periphery, said table being positioned to successively bring said slots below the drill of said press; a fixed vise jaw in the axial extremity of each slot; a movable vise jaw in the peripherial extremity of each slot; a plurality of gauge pins projecting from said table, there being one pin for each slot therein; a reciprocating pusher arm engageable with said pins to rotate said table by successive intervals corresponding to the slot spaces; a pressure cylinder having a pressure operated piston; means connecting said piston with said pusher arm to operate the latter a swinging lever pivoted intermediate its extremities to swing in the plane of said table; a bell-crank lever positioned at the edge of said table; means for rotating said bell-crank lever from one extremity of said swinging lever; and means for connecting the other extremity of said swinging lever to said pusher arm so that when said pusher arm reaches its extreme forward position, said bell-crank lever will move against said table to stop further movement thereof.

3. A drill press feeding device comprising: a horizontal rotary table having a plurality of equally spaced vise slots in its periphery, said table being positioned to successively bring said slots below the drill of said press; a fixed vise jaw in the axial extremity of each slot; a movable vise jaw in the peripherial extremity of each slot; a plurality of gauge pins projecting from said table, there being one pin for each slot therein; a reciprocating pusher arm engageable with said pins to rotate said table by successive intervals corresponding to the slot spaces; a pressure cylinder having a pressure operated piston; means connecting said piston with said pusher arm to operate the latter; and adjustable stop means for limiting the movement of said piston.

4. A drill press feeding device comprising: a horizontal rotary table having a plurality of equally spaced vise slots in its periphery, said table being positioned to successively bring said slots below the drill of said press; a fixed vise jaw in the axial extremity of each slot; a movable vise jaw in the peripherial extremity of each slot; means for successively rotating said table one slot space; means for pressing the movable jaw toward the fixed jaw during the drilling operation; a pin projecting upwardly from each movable jaw; and a beveled surface positioned in the path of said pins to engage the latter and move them radially outward during the rotation of said table to release the work from said jaws.

5. A drill press feeding device comprising: a horizontal rotary table having a plurality of equally spaced vise slots in its periphery, said table being positioned to successively bring said slots below the drill of said press; a fixed vise jaw in the axial extremity of each slot; a movable vise jaw in the peripherial extremity of each slot; means for successively rotating said table one slot space; means for pressing the movable jaw toward the fixed jaw during the drilling operation; a pin projecting upwardly from each movable jaw; a beveled surface positioned in the path of said pins to engage the latter and move them radially outward during the rotation of said table to release the work from said jaws; and reciprocating means for engaging said movable jaws to move them radially inward prior to the drilling operation.

6. A drill press feeding device comprising: a horizontal rotary table having a plurality of equally spaced vise slots in its periphery, said table being positioned to successively bring said slots below the drill of said press; a fixed vise jaw in the axial extremity of each slot; a movable vise jaw slidably mounted in the peripherial extremity of each slot; a swinging lever mounted to swing in the plane of said table; means actuated from one extremity of said lever for successively rotating said table one slot space; and means operable from the other extremity of said lever for preventing rotation of said table when said rotating means is in its withdrawn position.

7. A drill press feeding device comprising: a horizontal rotary table having a plurality of equally spaced vise slots in its periphery, said table being positioned to successively bring said slots below the drill of said press, the sides of each slot being provided with longitudinally extending channels; a fixed vise jaw; a movable vise jaw; ribs formed on the sides of said vise jaws slidably fitted into the channels of said slots to maintain the jaws in alignment with each other and with said table; means for successively rotating said table one slot space; a clamping member; means for causing said clamping member to engage each successive movable vise jaw during each pause of said table to force the movable jaw toward the fixed jaw during the drilling operation.

8. A drill press feeding device comprising: a horizontal rotary table having a plurality of equally spaced vise slots in its periphery, said table being positioned to successively bring said slots below the drill of said press, the sides of each slot being provided with longitudinally extending channels; a fixed vise jaw; a movable vise jaw; ribs formed on the sides of said vise jaws slidably fitted into the channels of said slots to maintain the jaws in alignment with each other and with said table; means for successively rotating said table one slot space; a clamping member; means for causing said clamping member to engage each successive movable vise jaw during each pause of said table to force the movable jaw toward the fixed jaw during the drilling operation; a projection on each movable jaw extending above the plane of said table; and a stationary member positioned in the path of said projections to cause said movable jaws to move away from said fixed jaws in consequence of the rotation of said table.

9. A drill press feeding device comprising: a horizontal rotary table having a plurality of equally spaced vise slots in its periphery, said table being positioned to successively bring said slots below the drill of said press, the sides of each slot being provided with longitudinally extending channels; a fixed vise jaw; a movable vise jaw; ribs formed on the sides of said vise jaws slidably fitted into the channels of said slots to maintain the jaws in alignment with each other and with said table; means for successively rotating said table one slot space; a clamping member; means for causing said clamping member to engage each successive movable vise jaw during each pause of said table to force the movable jaw toward the fixed jaw during the drilling operation; and means positioned to successively engage said movable jaws and move them toward the fixed jaws before said clamping member engages said movable jaws.

WILLIAM W. HECKETHORN.